April 21, 1970  W. W. SIMMONS ET AL  3,508,166

PASSIVE OPTICAL ISOLATOR

Filed Oct. 9, 1967

William W. Simmons,
Robert S. Witte,
INVENTORS.

BY.

Edward Dugas
AGENT.

United States Patent Office 3,508,166
Patented Apr. 21, 1970

3,508,166
PASSIVE OPTICAL ISOLATOR
William W. Simmons, Palos Verdes Peninsula, and Robert
S. Witte, Redondo Beach, Calif., assignors to TRW
Inc., Redondo Beach, Calif., a corporation of Ohio
Filed Oct. 9, 1967, Ser. No. 673,781
Int. Cl. H01s 3/00
U.S. Cl. 331—94.5                         8 Claims

ABSTRACT OF THE DISCLOSURE

The invention is directed to a device for generating traveling wave oscillations in a laser loop cavity. The invention is based on the technique of having the gain of the cavity different for a clockwise wave vs. a counter-clockwise wave. In one embodiment of the invention, an active element is pumped by an optical light source to emit a beam of coherent radiation. Reflectors direct the emitted beam from one end of the active element to the other end, forming a closed loop cavity.

An optical element comprised of at least two lenses is interposed in the beam path within the loop cavity. This element serves to expand the cross-sectional area of the beam for rays traveling in one of the preferred cavity directions and to contract the cross-sectional area of the beam for rays traveling in the other preferred cavity direction. The magnitude of beam expansion is such that a portion of the expanded beam bypasses the active element.

BACKGROUND OF THE INVENTION

This invention pertains to the field of optical cavities and, more particularly, to an optical laser cavity having a gain characteristic which is directional for generating traveling waves. Various devices exist in the prior art for generating a traveling wave in a laser cavity. One such device utilizing an optical isolator is disclosed in the article entitled "Spectral Output and Spiking Behavior of Solid-State Lasers," published in Journal of Applied Physics, vol. 34, No. 8, page 2289 (1963). The optical isolator that is disclosed in that article consists of a polarizer and electro-optical rotaters. The optical isolator effectively suppresses unwanted multimode oscillation within the laser cavity.

SUMMARY OF THE INVENTION

In the preferred embodiment of the invention, at least reflectors are disposed to define a closed loop optical cavity. An active element is disposed within the cavity between two of the reflectors to produce stimulated emission of light within the optical cavity. Means are provided for pumping the active element and optical means are interposed in the optical cavity to expand the generated optical beam traveling in a first direction and to contract the generated optical beam traveling in an opposite direction, causing the gain of the cavity to be directional.

Accordingly, it is an object of the present invention to provide an improved traveling wave oscillator.

It is a further object of the present invention to provide a laser cavity for generating traveling waves.

The aforementioned and other objects of the present invention will become more apparent and better understood when taken in conjunction with the following description and drawings, throughout which like characters indicate like parts and which drawings form a part of this application.

DESCRIPTION OF THE PREFERRED EMBODIMENTS

Figure 1:
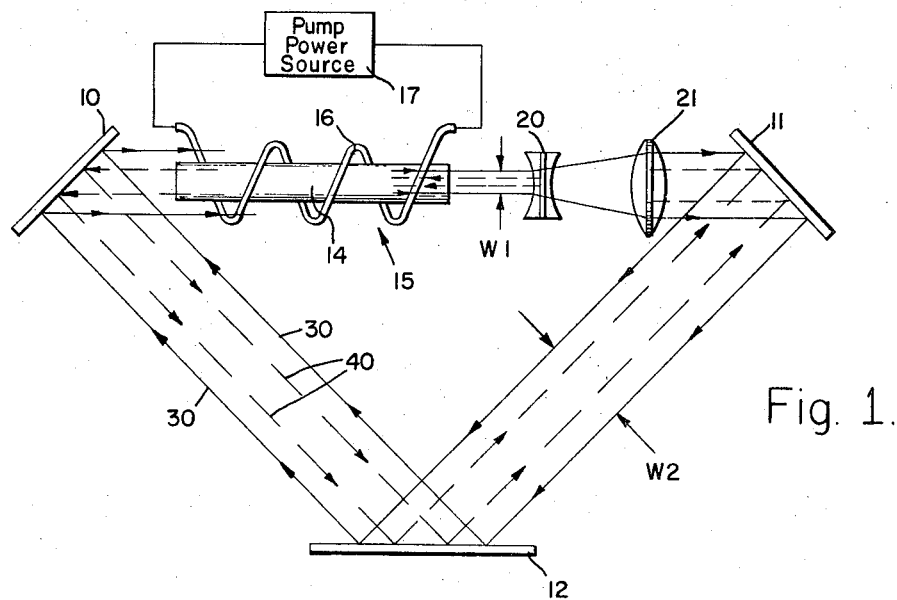
FIGURE 1 is a schematic sectional view of a laser structure embodying the present invention in a particular form.

Referring to FIGURE 1, a closed loop optical cavity is shown defined by the reflectors 10, 11 and 12, the reflective surfaces of which are aligned to cause optical rays generated within the cavity to traverse a closed path which includes all three reflectors. An active laser element 14, which may be a solid medium such as ruby or a gaseous medium such as a helium-neon mixture, is positioned within the defined optical cavity between two of the reflectors. The active element 14 is optically pumped by a suitable light source 15 in the case of a solid element, which may be comprised of a xenon flash tube or mercury discharge lamp 16, activated from a pump power source 17, to produce optical pumping of the active laser element 14. The output beam from the active laser material 14 has a width $W_1$. The beam leaving the active laser material in a direction defined by the arrowed lines 30 passes through a diverging lens 20, which is interposed in the cavity, and which causes the beam to be expanded to a width $W_2$. This expanded beam is collimated by a collimating lens 21 which is interposed into the expanded beam. The expanded beam then is reflected from the reflector 11 to the reflector 12 and from there to the reflector 10 which redirects the expanded beam back to the active laser element 14. Only that portion of the expanded beam $W_2$ which corresponds to the beam width $W_1$ will be transmitted through the active element. The remaining radiation will bypass the laser element, and will not be amplified by said element. The beam traveling round the defined cavity in a direction defined with the action arrows 40 will be converged by the condensing lens 21 and collimated by the diverging lens 20 and pass through the active laser element 14 and be further amplified by the pumping action thereof. An optical beam which traverses the path 40 will therefore receive a minimal amount of dissipated loss or, in other words, the beam will receive a maximum gain for the system if it traverses the path defined by the action arrows 40 and will receive what can be considered a maximum distributed loss if it traverses the clockwise path defined by the action arrows 30. This directional gain characteristic of the cavity allows for the efficient generation of traveling waves in the cavity. Either reflectors 10, 11 or 12 may be made partially transparent to allow the removal of a portion of the optical energy generated within the cavity. The reflectors shown in FIGURE 1 are of the flat, planar type, and it will be obvious to those persons skilled in the art that concave reflectors may be utilized with the teachings of this invention without departing from the scope thereof. Furthermore, any combination of optical elements which produces the directionally dependent change in the cross-sectional area of the beam may be employed in place of the depicted two element lens system comprised of lenses 20 and 21.

Figure 2:
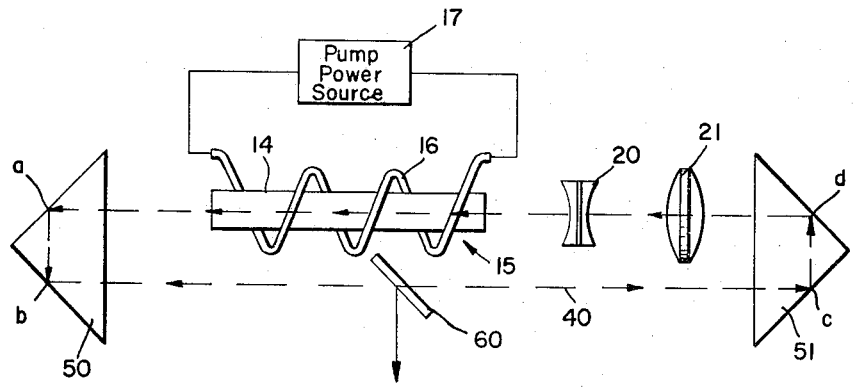
FIGURE 2 is a schematic sectional view of another embodiment of the invention.

Referring to FIGURE 2, two roof prisms 50 and 51 are spaced apart defining an optical cavity having a substantially rectangular optical path $a$, $b$, $c$ and $d$. The active laser element is positioned in the path $a$–$b$. The laser pumping means 15, comprised of the flash lamp 16 and the pump power source 17, provide the pumping energy for pumping laser element 14 to generate stimulated emissions therein. The optical rays traversing the path $a$, $b$, $c$ and $d$ in a counter-clockwise direction are all passed through the active element 14 similar to the embodiment of FIGURE 1. Those rays which pass in a clockwise direction around the resonant cavity are expanded by the diverging lens 20 and collimated by the collimating lens 21 such that the width (cross-sectional area) of the clockwise beam is greater than the width (cross-sectional area) of the active element 14, causing only a portion of the expanded beam to pass through the active element. The gain of the cavity of FIGURE 2 is therefore directional, having its highest gain for a beam traversing the cavity in a counter-clockwise direction. A beam splitter 60 is interposed in the optical path b–c to direct a usable portion of the optical energy from the defined cavity. The roof prisms 50 and 51 are aligned so as to allow traveling wave oscillations in the cavity.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as fall within the true scope of the invention.

What is claimed is:

1. In combination:
   at least three reflectors disposed to define a closed loop optical cavity;
   an active element disposed within said cavity and operative to coact with said cavity to produce a beam of light waves;
   means for pumping said active element;
   diverging lens means interposed in said beam path for expanding said light waves which traverse said cavity in a first direction and for contracting said light waves which traverse said cavity in an opposite direction, said beam of light waves expanded in an amount such that a portion of said expanded beam traverses said closed loop cavity without passing through said active element; and
   collimating means collimating said expanding beam.

2. The invention, according to claim 1, wherein at least one of said reflectors is partially transparent.

3. The invention, according to claim 1, and further comprising a beam splitter inserted in said beam path.

4. The invention, according to claim 1, wherein said reflectors are placed apart a distance corresponding to an integral number of wavelengths of said produced beam of light.

5. The invention, according to claim 1, wherein said reflectors are placed apart a predetermined distance which causes traveling waves to be produced in said optical cavity.

6. The invention, according to claim 1, wherein there are four reflectors, each positioned at a 45° angle with respect to each other.

7. The invention, according to claim 1, wherein there are provided four reflectors consisting of two roof prisms disposed to define the closed loop of said optical cavity.

8. A traveling wave laser system compirsing:
   (a) a laser for producing a beam of traveling waves of light, said laser including an active element having a predetermined cross-section;
   (b) optical reflector means arranged to define a closed loop cavity for said laser to permit traveling waves to travel through said cavity in opposite directions; and
   (c) fixed optical lens means for expanding and collimating said beam of traveling waves traveling in a first direction, whereby a portion of said traveling waves traveling in a second direction opposite said first direction are passed entirely through said active element, while traveling waves traveling in said first direction are expanded to have a cross-section larger than that of said active element, thereby to reduce the gain of said waves traveling in said first direction.

References Cited

UNITED STATES PATENTS 3,434,073  3/1969  Forkner _____ 331—94.5

OTHER REFERENCES

"Traveling-Wave Ruby Laser with a Passive Optical Isolator," M. Hercher et al., J.O.A.P., vol. 36, p. 3351, 1965.

RONALD L. WIBERT, Examiner

P. K. GODWIN, JR., Assistant Examiner

U.S. Cl. X.R.

356—106